April 19, 1960 R. C. KELNER ET AL 2,933,719

MAGNETIC AMPLIFIERS

Filed Oct. 3, 1956 2 Sheets-Sheet 1

*INVENTORS*

ROBERT C. KELNER
HARVEY RUBINSTEIN

*BY* [signature]
*ATTORNEY*

MAGNETIC AMPLIFIERS

Filed Oct. 3, 1956 2 Sheets-Sheet 2

INVENTORS
ROBERT C. KELNER
HARVEY RUBINSTEIN
BY Joseph Weingarten
ATTORNEY

United States Patent Office 2,933,719

Patented Apr. 19, 1960

2,933,719

MAGNETIC AMPLIFIERS

Robert C. Kelner, Concord, and Harvey Rubinstein, Lynnfield Center, Mass., assignors, by mesne assignments, to Laboratory for Electronics, Inc., Boston, Mass., a corporation of Delaware Application October 3, 1956, Serial No. 613,705

17 Claims. (Cl. 340—174)

The present invention relates in general to new and improved magnetic amplifiers and power supplies therefor.

Magnetic amplifiers are peculiarly adapted for use in a computer system employing a binary code. The saturable magnetic core of such an amplifier preferably has a hysteresis characteristic which closely approaches a rectangle. Accordingly, the application of a pulse of magnetizing force magnetizes, or sets, the core to saturation in one direction almost instantaneously, while reset, or magnetic saturation in the opposite direction, is accomplished by applying a magnetizing pulse to the core in the reverse direction. The two magnetic core states so obtained constitute a magnetic manifestation of the binary digits or bits of a binary code.

In complex computer systems where voltage driven magnetic amplifiers perform the duel functions of amplifying and of performing logical operations, it frequently is necessary to drive a large number of amplifiers from the same power supply. Accordingly, a pulse power supply having a low internal resistance and high power output is required. Additionally, the magnetic amplifiers themselves must be capable of pulse power amplification in order to pass on the requisite amount of pulse energy to change the data of a subsequent core.

In order to maintain stable operation in magnetic amplifiers, it is desirable that the area of the magnetizing pulses remains constant. To prevent an increase in the instantaneous power required from the associated pulse sources while this condition is maintained, the duration of the pulses must remain constant. Accordingly, the shape of the applied wave packets, each of which comprises one positive and one negative pulse, must be maintained constant. In operation, the frequency of the applied pulses often varies. Such a variation may arise where the spacing of the clock track pulses, each of which gives rise to a wave packet that pulses the amplifiers, varies throughout the length of the magnetic record on which the clock pulses are stored. Unequal spacing may also occur between the last pulse of a series of equally spaced clock pulses and the first pulse of the series, where the pulses are stored on a recurring record of fixed length. Prior art solutions of this problem provide for an increase in the pulse amplitude to balance the shortened pulse duration due to the increased frequency. The instrumentation of this technique generally requires additional apparatus and hence it is not economical.

Similarly, in prior art devices the pulse output frequency of magnetic amplifiers employing two or more cores is limited by the requirement that the output functions of successive cores occur during separate time intervals. Any increase in frequency must, accordingly, be accompanied by an increase in the required instantaneous power, with the attendant additional apparatus.

In binary computer systems where magnetic amplifiers employing saturable magnetic cores are used as logical circuit elements, the state of magnetization of the core at a given time determines the binary number stored therein. Thus, binary Zeros and Ones may arbitrarily be represented by a signal comprising the presence and absence, respectively of pulses of a given polarity, which signal when applied to the core will either magnetize it to saturation in one direction or fail to apply a magnetizing force. It is often desirable in logical computer operations to transform a binary One into a binary Zero or vice versa, i.e. to obtain an inverted signal comprising the presence of pulses of the aforementioned given polarity where there is an absence of pulses and vice versa. Prior art devices have generally found it necessary to add special components to achieve this result.

Accordingly, it is an object of this invention to provide new and improved magnetic amplifiers and power supplies therefor.

It is an added object of this invention to provide magnetic power amplifiers having a rapid response time.

It is a further object of this invention to provide magnetic amplifiers having a pulse power supply with high power output and low internal resistance.

It is another object of this invention to provide magnetic amplifiers capable of being operated at variable frequencies without effect upon the wave shape of the output signal.

It is an additional object of this invention to provide magnetic amplifiers capable of being operated at variable frequencies while maintaining the instantaneous power input constant.

It is still a further object of this invention to provide double core magnetic amplifiers capable of operating at frequencies in excess of those heretofore possible, without an increase in the applied instantaneous power input.

It is still another object of this invention to provide magnetic amplifiers for use as logical elements in a computer circuit, which provide direct as well as inverted output signals.

These and other novel features of the invention together with further objects and advantages thereof will become more apparent from the following detailed specification with reference to the accompanying drawings in which.

In accordance with the principles of the present invention a magnetic amplifier circuit is provided comprising a magnetic core capable of being rapidly set or reset, i.e. magnetized to saturation in one of two directions by the application of two series of alternately positive and negative pulses. Each pulse period consists of a dwell period and a pulse packet comprising a positive and a negative pulse. During the dwell period the pulsed terminals are kept at a reference potential, e.g. ground. The length of the dwell period between successive pulse packets is variable and hence permits of variation in the pulse frequency without a change in the wave shape of the packet.

In the double core magnetic amplifier of the invention, the pulse frequency is increased over the maximum frequency available in prior art devices by an overlapping of the time intervals allotted to the output functions of the two cores. Since this requires no change in the wave shape of the pulse packets applied to the individual cores, such an increase in frequency is obtained without a corresponding increase in the required instantaneous pulse power. In shift registers, consisting of a number of tandem connected magnetic amplifiers of the kind described, the overlapping of the above mentioned time intervals of successive cores increases the speed of data transfer across the register. The invention herein described further provides an additional winding on the core of the magnetic amplifier, whereby logical signal inversion is obtained without the addition of special components.

Additionally, power supplies are provided capable of supplying constant amplitude pulses to a plurality of magnetic amplifiers connected thereto. The pulse frequency may be varied within predetermined limits while maintaining the instantaneous pulse power constant.

Figure 1:
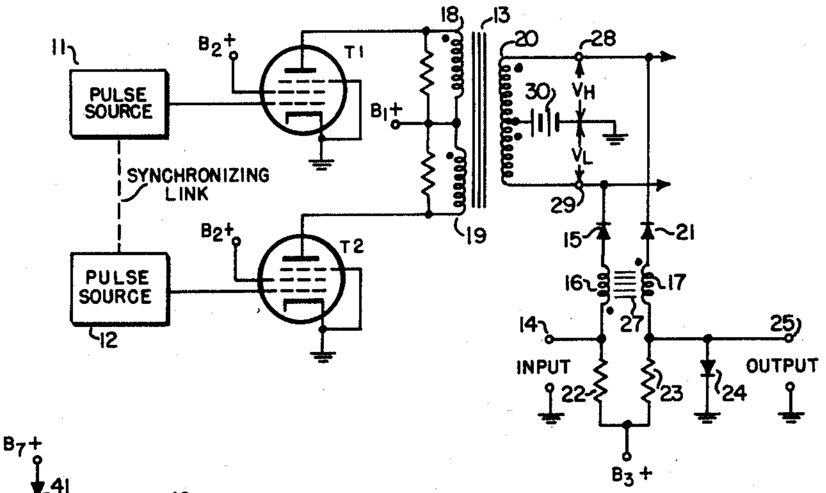
Fig. 1 illustrates one embodiment of the invention showing a single core magnetic amplifier and power supply therefor.

With reference now to Fig. 1, each pulse source 11 and 12 presents a low output impedance and supplies a series of like polarity pulses alternately to the control grids of pentodes $T_1$ and $T_2$ respectively, the latter presenting a low output impedance. In the instant case these pulses are positive. Synchronism is maintained between the pulse outputs of sources 11 and 12 and is indicated diagrammatically in the drawing by a broken line connecting the two sources. The screen grid of each pentode is tied in conventional manner to a positive D.C. voltage source $B_2$, while the suppressor grid is connected to the cathode and then to ground. Each plate is connected to the center-tapped primary winding of transformer 13, respective halves 18 and 19 of said primary winding having a damping resistor connected thereacross to prevent ripples. The center tap is connected to a high voltage D.C. source $B_1$ which supplies the plate voltage. The pentode is operated on the diode portion of its characteristic in order to obtain high voltage regulation. A source 30 of low D.C. voltage is connected between a tap on the secondary winding and ground. The two outputs of the power supply are obtained between respective terminals 28 and 29 of the secondary winding 20 and ground. The primary-to-secondary turns ratio of transformer 13 is preferably high, in order to achieve high voltage regulation. The transformer step-down turns ratio further reduces the output impedance of the power supply in order to increase the number of magnetic amplifier stages which may be energized from the output. Terminals 28 and 29 are connected to diodes 15 and 21 respectively, each diode being further connected to coils 16 and 17. The latter are wound in opposition on saturable magnetic core 27, as indicated by the dots in Fig. 1. The core is of the type having a hysteresis characteristic which approaches a rectangle, permitting it to exist in one of two magnetic states. Accordingly, the application of a predetermined amount of magnetizing force will "set" the core to saturation in one direction while the application in the opposite direction of a predetermined amount of magnetizing force will "reset" the core to saturation in the opposite direction. Winding 16 is connected to resistor 22 by a first junction point and winding 17 is connected to resistor 23 by a second junction point. The two resistors are tied together and connected to a positive D.C. source $B_3$. Input terminal 14 is connected to the aforesaid first junction point. A non-linear impedance 24, preferably a diode, is connected between the second junction point and ground, while the output signal is obtained between terminal 25 which is connected to the second junction point and ground. The poling of diode 24 is such as to clamp output terminal 25 to ground when there is a change in the direction of magnetization of the core as a result of the application of a $V_H$ pulse. The function of the network consisting of the above mentioned resistors 22 and 23, source $B_3$ and diode 24, is to serve as a coupling network where a number of tandem connected magnetic amplifiers are used and to provide an output impedance which is independent of the number of amplifiers which are directly driven from a preceding amplifier. The poling of diodes 15 and 21 is such as to permit the application of pulses of one polarity only to the core. In the embodiment of Fig. 1, only negative pulses are able to magnetize the core. Battery 30 prevents diodes 15 and 21 from conducting prior to the arrival of a negative pulse greater than the battery voltage.

Figure 2:
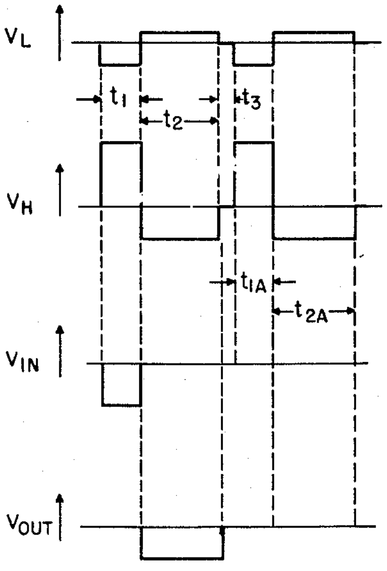
Fig. 2 illustrates the relationship of the pulses pertaining to the operation of the amplifier of Fig. 1.

Fig. 2 illustrates the time relationship of the pulses. As shown, output voltages $V_H$ and $V_L$ comprise separate series of alternately positive and negative pulses. It will be noted that positive pulses of the $V_L$ series occur in time coincidence with negative $V_H$ pulses and vice versa. Each pulse period comprises discrete time intervals $t_1$, $t_2$ and $t_3$. Interval $t_1$ which comprises the read-in interval of the core, i.e. the interval during which data is read into the core, may be of equal duration as interval $t_2$ which constitutes the read-out interval. In a preferred embodiment, these intervals are of different duration as shown in the drawing. Interval $t_3$ represents a dwell period of variable length before the beginning of the next pulse period. The output pulse occurring during interval $t_2$ is shown to be a power-amplified version of the input pulse $V_{IN}$ applied during interval $t_1$, while the absence of an input pulse, as during interval $t_{1A}$, is followed by the absence of an output pulse during interval $t_{2A}$. In operation, due to variations in the spacing of the clock pulses, it is sometimes necessary to vary the frequency of the pulses applied to the magnetic amplifier without affecting the operation of the amplifier. If the instantaneous power drawn from the amplifier power supply is to remain the same while the applied magnetizing force remains constant, the pulse area must remain the same. Accordingly, the shape of the applied wave packet, i.e. the shape of the waveform occurring during intervals $t_1$ and $t_2$, must remain unchanged. To this end, the dwell period $t_3$ may be varied in length, producing thereby a change in the length of the pulse period, i.e. the sum total of intervals $t_1$, $t_2$ and $t_3$. Accordingly, a change is produced in the pulse frequency without an attendant change in the wave shape of the pulse packet.

In operation, binary Zeros and Ones may be represented by the presence and absence, respectively of negative voltage pulses which comprise the input signal applied between terminal 14 and ground in synchronism with negative $V_L$ pulses. The pulses applied to the grids of tubes $T_1$ and $T_2$ by pulse sources 11 and 12, respectively, are amplified and supplied to the transformer primary. Pulse series $V_H$ and $V_L$ are derived between terminals 28 and 29, respectively and ground. The operation of the apparatus is such that the application of $V_{IN}$ pulses (or the absence thereof) occurs simultaneously with or overlaps the occurrence of each negative $V_L$ pulse. The application of a One signal to terminal 14 during interval $t_{1A}$ will tie the latter to ground. The simultaneous application of a negative $V_L$ pulse between terminal 29 and ground will magnetize or set core 27 to saturation in one direction. Current flow in winding 17 due to transformer action of the core is prevented by the simultaneous application of a positive $V_H$ pulse to diode 21, rendering the diode non-conductive. During the interval $t_{2A}$ the core is reset by the application of a negative $V_H$ pulse applied to oppositely wound coil 17, which then assumes a high impedance such that the current flowing in coil 17 is less than the current that had been flowing in resistor 23 during the interval $t_{1A}$. Diode 24 then clamps terminal 25 to ground, whereby a binary One is indicated at the output during interval $t_{2A}$. The positive $V_L$ pulse, which simultaneously appears between terminals 29 and ground, renders diode 15 non-conductive and prevents current flow in winding 16 due to transformer action of the core. Diode 24 clamps output terminal 25 to ground whenever the core is reset in response to a negative $V_H$ pulse. Accordingly, the output pulses will either be negative or zero. As explained above, the input signal applied at terminal 14 consists of negative pulses or the absence thereof, applied in synchronism with the negative $V_L$ pulses. The application of a negative input pulse representing a binary Zero, such as occurs during interval $t_1$, will render diode 15 non-conductive by making terminal 14 more negative than terminal 29 and, hence, it will prevent the setting of the core. Accordingly, core 27 will remain in the reset state and the negative $V_H$ pulse occurring during interval $t_2$ will not change the magnetization of the core. The impedance of winding 17 will be small and nearly all of the voltage drop will appear across resistor 23. Terminal 25 will then be at a negative potential to indicate binary Zero at the output.

It will be apparent from Fig. 2 that the output pulse appearing at terminal 25 in response to a binary Zero signal at the input, represents a power-amplified input pulse. Hence, the circuit operates as a power amplifier. The dwell period occurring during interval $t_3$ may be varied in length. Accordingly, the pulse period and hence, the pulse frequency, may be altered without affecting the operation of the amplifier or the wave shape of its output signal.

Figure 3:
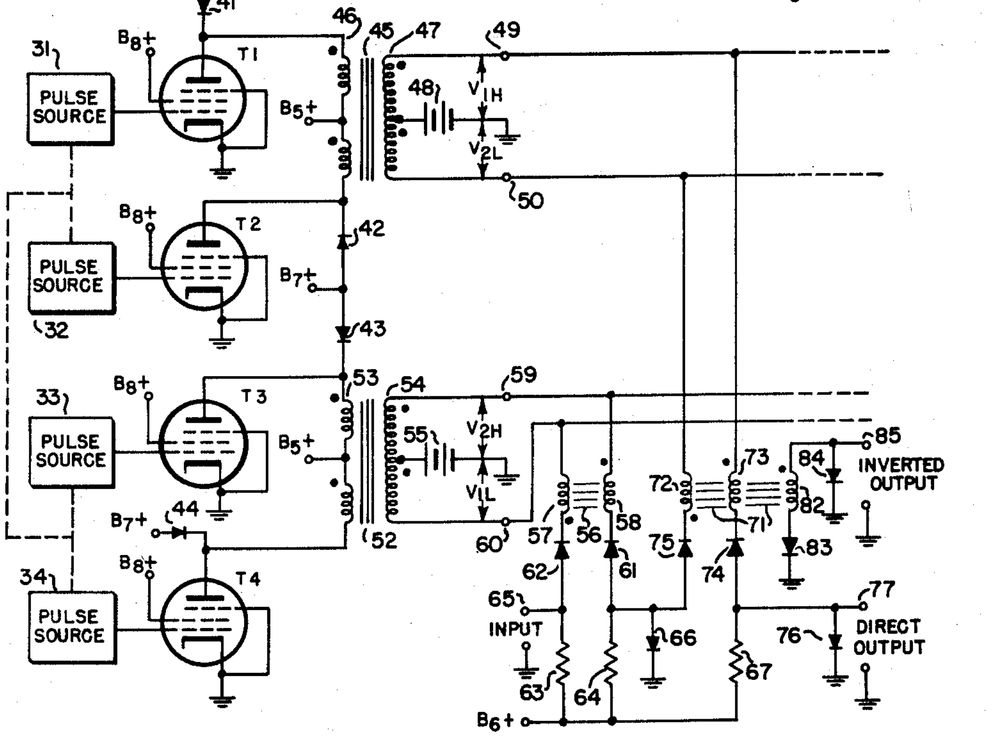
Fig. 3 illustrates another embodiment of the invention showing a double core magnetic amplifier and power supply therefor, one core having a direct output only, the other core having direct and inverted outputs.

With reference now to Fig. 3, a two-core magnetic amplifier and power supply therefor are illustrated. In similar manner to the apparatus of Fig. 1, pulse sources 31, 32, 33 and 34 have a low output impedance, respective pairs 31—32 and 33—34 alternately supplying like polarity pulses to the grids of pentodes $T_1$, $T_2$ and $T_3$, $T_4$ respectively. In the instant case these pulses are positive. Synchronism is maintained between the outputs of respective pulse sources of each pair, as shown diagrammatically in the drawing by broken lines linking the pulse sources. Additionally, synchronism is maintained between respective pairs of pulse sources so that the pulses appearing at the outputs of sources 32 and 33 occur simultaneously, as do the pulses appearing at the outputs of sources 31 and 34. Each pentode presents a low output impedance and is connected in conventional manner, each having a screen grid tied to a positive D.C. source $B_8$ and a suppressor grid connected to the cathode and then to ground. The plate potential of each tube is derived from a positive D.C. source $B_5$. Each pentode is operated on the diode portion of its respective characteristic in order to obtain high voltage regulation. Diodes 41, 42, 43 and 44, respectively are connected between the plates of respective tubes $T_1$, $T_2$, $T_3$ and $T_4$ and source $B_7$ and are poled so as to prevent the voltage from rising above the potential of source $B_7$. The primary winding 46 of an output transformer 45 is connected between the plates of tubes $T_1$ and $T_2$. In similar manner, the primary winding 53 of an output transformer 52 is connected between the plates of tubes $T_3$ and $T_4$. Each of the aforesaid primary windings is center tapped, said center tap being further connected to the aforesaid source $B_5$. The secondary winding 47 of transformer 45 has two output terminals 49 and 50 and a tap which is connected to the positive terminal of a source of low D.C. voltage 48, the negative terminal of said source being connected to ground. A pair of complementary series of voltage pulses $V_{2L}$ and $V_{1H}$ is derived between terminals 49 and 50, respectively and ground. In similar manner, the secondary winding 54 of output transformer 52 is connected to terminals 59 and 60. The tap of winding 54 is connected to the positive terminal of a source of low D.C. voltage 55, whose negative terminal is connected to ground. A pair of complementary series of voltage pulses $V_{1L}$ and $V_{2H}$ is derived between terminals 59 and 60, respectively and ground. Both transformers 45 and 52 have a high primary-to-secondary turns ratio in order to obtain high voltage regulation. This turns ratio further provides a low impedance at the transformer outputs thereby increasing the number of magnetic amplifiers which may be pulsed therefrom. Saturable magnetic cores 56 and 71 preferably have rectangular hysteresis characteristics, as explained before, enabling them to exist either in the set or the reset magnetic state. Core 56 contains oppositely wound windings 57 and 58, as indicated by the dot notation in Fig. 3. Winding 57 is connected between terminal 60 and one terminal of a diode 62. The other diode terminal is connected to a first junction point which has an input terminal 65 connected thereto. A resistor 63 is connected between the first junction point and a positive D.C. source $B_6$. Winding 58 is connected between terminal 59 and one terminal of a diode 61, the other terminal of said diode being connected to a second junction point. A resistor 64 is connected between the second junction point and the aforementioned source $B_6$. A diode 66 is connected across the output of the first amplifier between said second junction point and ground. Core 71 contains two oppositely wound windings 72 and 73 and a winding 82 which is wound in the same direction as winding 73, as indicated by the dot notation in Fig. 3. Winding 72 is connected between terminal 50 and one terminal of a diode 75, the other terminal of said last mentioned diode being connected to the aforementioned second junction point. Winding 73 is connected between terminal 49 and one terminal of a diode 74, the other terminal of said diode being connected to a third junction point. A resistor 67 is connected between the third junction point and source $B_6$. A diode 76 is connected across the direct output of the second amplifier between the third junction point and ground, the direct output signal being obtained between a terminal 77, connected to the aforementioned third junction point, and ground. A diode 83 is connected between one terminal of winding 82 and ground. The other end of winding 82 terminates in an inverted signal output terminal 85, having a diode 84 connected between said terminal and ground.

The poling of diodes 61, 62, 74 and 75 is such as to render the diodes conductive when a negative voltage is applied to the diode terminal which connects to a core winding. Batteries 48 and 55 respectively prevent these diodes from conducting prior to the arrival of a negative pulse greater than the battery voltage. Diode 83 is poled to conduct when the terminal which is connected to winding 82 becomes positive. Diodes 66, 76 and 84 are poled to prevent the point to which they are connected from rising above ground. The function of the network consisting of resistors 63 and 64, source $B_6$ and diode 66 is to serve as a coupling network between the output of a preceding core and the input to core 71. The output circuits of the direct and inverted signal outputs provide an output impedance which is independent of the number of amplifiers driven therefrom. The primary-to-secondary turns ratio of transformers 45 and 52 is preferably high in order to present a low output impedance and to permit the energization of a large number of amplifiers.

Figure 4:
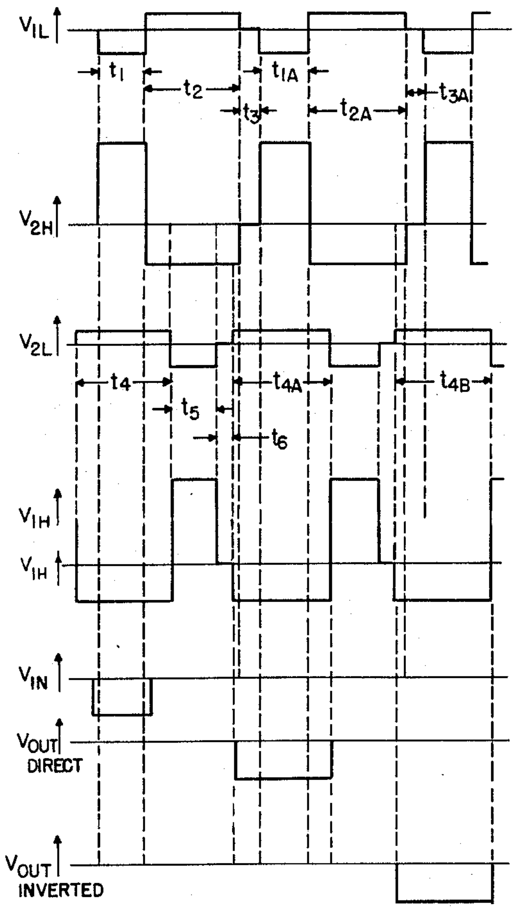
Fig. 4 illustrates the relationship of the pulses pertaining to the operation of the amplifier of Fig. 3.

Fig. 4 illustrates the relationship of the pulses in the operation of the apparatus of Fig. 3. $V_{1L}$ and $V_{2H}$ constitute one pair of complementary series of alternately positive and negative pulses, as do $V_{2L}$ and $V_{1H}$. During the interval $t_1$ which constitutes the read-in interval of core 56, a negative $V_{1L}$ pulse is applied while a positive $V_{2H}$ pulse occurs simultaneously. The pulse polarities are reversed in the subsequent $t_2$ interval which constitutes the read-out interval of core 56. Thereafter, a dwell period $t_3$ occurs during which no energizing voltage is applied. Similarly, during interval $t_4$ which constitutes the read-out interval of core 71 and is equal in length to interval $t_2$, a positive $V_{2L}$ pulse occurs simultaneously with a negative $V_{1H}$ pulse. The above mentioned polarities are reversed during interval $t_5$. The latter constitutes the read-in interval of core 71 and is equal in duration to interval $t_1$. It is followed by dwell period $t_6$. It will be noted that the negative $V_{2L}$ pulse together with the subsequent dwell period $t_6$, occurs entirely within the duration of the negative $V_{2H}$ pulse. The dwell period may also be arranged to fall outside interval $t_2$. The significance of this will be explained hereinbelow in connection with the operation of the apparatus. Fig. 4 further illustrates the input signal $V_{IN}$ applied at terminal 65 consisting of binary Zeros and Ones which comprise the presence or absence, respectively of negative voltage pulses. The direct output signal appearing at terminal 77 during interval $t_{4A}$, in response to the input signal applied during interval $t_1$, is shown to be a power-amplified pulse of the same polarity. The inverted output signal appearing simultaneously, comprises the absence of a negative pulse, or zero potential. Conversely, the absence of a negative input pulse during interval $t_{1A}$ produces an absence of a pulse at the direct signal output during interval $t_{4B}$ and a negative pulse at the inverted signal output during the same interval.

In operation, the pulses applied to the grids of respective tubes $T_1$, $T_2$, $T_3$ and $T_4$ in Fig. 3, are amplified and supplied to the transformer primaries. When a binary One signal consisting of the absence of a pulse, as shown at interval $t_{1A}$ in Fig. 4, is applied to terminal 65, the simultaneous application of the negative $V_{1L}$ pulse to winding 57 will set core 56. The simultaneous application of a positive $V_{2H}$ pulse to oppositely wound winding 58 renders diode 61 non-conductive and prevents current flow due to transformer action. During the next interval $t_{2A}$, the negative $V_{2H}$ pulse applied to oppositely wound coil 58 resets core 56 while the positive $V_{1L}$ pulse, simultaneously applied to diode 62, renders the latter non-conductive to prevent current flow due to transformer action. Clamping diode 66 prevents the rise in potential of the aforementioned second junction point above ground. A dwell period $t_{3A}$ follows the occurrence of the negative $V_{2H}$ pulse. During the $t_{2A}$ interval, a negative $V_{2L}$ pulse appears at terminal 50 and is applied to winding 72 to set core 71. As in the case of core 56, the positive $V_{1H}$ pulse which is simultaneously applied to winding 73, renders diode 74 non-conductive and prevents current flow in winding 73 due to transformer action in core 71. The negative $V_{1H}$ pulse occurring thereafter resets core 71. The potential of the third junction point is prevented from rising above ground by clamping diode 76, causing the signal at direct output terminal 77 to be at ground potential, i.e. to represent a binary One. At the same time, the poling of diode 83 permits transformer action between winding 82 and 72, whereby the inverted output signal at terminal 85 will be negative and will indicate a binary Zero. The application to terminal 65 of a binary Zero signal, i.e. the application of a negative pulse as shown at interval $t_1$ in Fig. 4, will render diode 62 non-conductive when a negative $V_{1L}$ pulse is simultaneously applied to winding 57. Accordingly, the $V_{1L}$ pulse will fail to set core 56 and the subsequently appearing negative $V_{2H}$ pulse will fail to reset the core. This in turn, will cause the second junction point to assume a negative potential which prevents diode 75 from conducting when the negative $V_{2L}$ pulse is simultaneously applied. Core 71 will remain in its set state causing the subsequent negative $V_{1H}$ pulse to encounter a low impedance winding 73. Accordingly, the potential at direct output terminal 77 will be negative, and hence indicative of a binary Zero signal, while the inverted output signal will indicate a binary One.

It will be seen that the double core magnetic amplifier herein described operates as a logical circuit element, binary signals being transferred from the input to the output either directly or in inverted form in one pulse period. As in the case of the single core amplifier, the frequency of pulsing the cores may be varied within the limits of the dwell period. Since this will not affect the wave shape of the pulse packets, no variation in the instantaneous applied power is necessary. Additionally, the overlapping of the read-out intervals of the two cores, e.g. the overlapping of $t_2$ and $t_{4A}$, makes it possible to begin the readout of core 71 before the read out of core 56 is terminated. The overlap in time of the readout intervals of the two cores of the amplifier is equivalent to an overlap of the pulse periods of the cores. Thus, it permits an increase in the frequency of operation of the two core magnetic amplifier over the maximum frequency at which it can normally be operated without an attendant increase in the required instantaneous power. The reason for this stems from the fact that the shape of the wave packet remains unchanged. Accordingly, the length of dwell periods $t_3$ and $t_6$ governs the frequency at which individual amplifier cores are pulsed, while the amount of overlap of the read-out intervals of respective cores will determine the amount of increase in the frequency of the amplifier output pulses over the maximum operating frequency without overlap, said increase occurring without an increase in the instantaneous applied power.

It will be seen that the pulses applied in the apparatus of Fig. 1 and Fig. 3 respectively, need not have the polarities shown, by way of example, in the drawings. It is important, however, that the relationship of respective pulse polarities remains the same. Thus, positive pulses could be chosen to magnetize the cores if the poling of the diodes connected in series with the core windings were reversed. Similarly, the binary digits at the amplifier input could be represented by a positive pulse or the absence thereof. Additionally, the output pulses of the pulse sources could be negative instead of positive if the rest of the apparatus, i.e. poling of transformer windings, diodes etc. is changed accordingly.

Having thus described the invention it will be apparent that numerous modifications and departures, as explained above, may now be made by those skilled in the art, all of which fall within the scope contemplated by the invention. Consequently, the invention herein disclosed is to be construed as limited only by the spirit and scope of the appended claims.

What is claimed is:

1. A magnetic amplifier comprising a saturable magnetic core having a substantially rectangular hysteresis characteristic, means for applying a first series of alternately positive and negative pulses to cyclically magnetize said core to saturation in one direction, respective pulses of said first series being rectangular in shape, means for applying a second series of alternately positive and negative pulses to cyclically magnetize said core to saturation in the opposite direction, respective pulses of said second series being rectangular in shape, each pulse period including a dwell period of variable length, respective pulses of said first series occuring at least in partial time coincidence with respective oppositely poled pulses of said second series, means for synchronously applying an input voltage in opposition to chosen ones of said first series of pulses to selectively prevent the magnetization of said core in said one direction, means for deriving an amplified output voltage through the agency of said core, the frequency of said output voltage being dependent upon the length of said dwell period.

2. A magnetic amplifier comprising a saturable magnetic core having a substantially rectangular hysteresis characteristic, means for applying a first series of alternately positive and negative pulses to cyclically magnetize said core to saturation in one direction, respective pulses of said first series being rectangular in shape, means for applying a second series of alternately positive and negative pulses to cyclically magnetize said core to saturation in the opposite direction, respective pulses of said second series being rectangular in shape, each pulse period including a dwell period of variable length equal to and time coincident with the dwell period of the other pulse series, respective pulses of said first series occurring in synchronism with respective oppositely poled pulses of said second series, means for synchronously applying input voltage pulses in opposition to chosen ones of said first series of pulses to selectively prevent the cyclical magnetization of said core in said one direction, means for deriving output voltage pulses from said second series of pulses which represent power-amplified input pulses, said output pulses having a frequency which is variable within the limits of said dwell period without an attendant change in the pulse shape.

3. A magnetic amplifier comprising a saturable magnetic core having a substantially rectangular hysteresis characteristic, means for applying respective first and second series of alternately positive and negative pulses, the pulses of each of said series being rectangular in shape, each pulse period including a dwell period of variable length, respective pulses of said first series occurring in time coincidence with respective oppositely poled pulses of said second series, the pulses of one polarity of said first series being adapted to cyclically magnetize said core to saturation in one direction, the pulses of the same polarity of said second series being adapted to cyclically magnetize said core to saturation in the opposite direction, unidirectional means adapted to render the application of pulses of respective first and second series which have a polarity opposite to said one polarity, without effect upon the magnetization of said core, means for neutralizing the effect of chosen pulses of said first series having said one polarity by applying input pulses in opposition thereto, means for deriving output pulses from said second series of pulses through the agency of said core, said output pulses corresponding to power-amplified input pulses having a frequency which is variable within the limits of said dwell periods while maintaining the instantaneous pulse power constant.

4. A magnetic amplifier comprising a saturable magnetic core having a substantially rectangular hysteresis characteristic, first and second coils wound in opposition on said core, first and second unidirectional current means respectively connected in series with said first and second coils, said first and second unidirectional current means being poled alike, means for applying a first series of alternately positive and negative pulses to said first coil, means for applying a second series of alternately positive and negative pulses to said second coil, the pulses of each of said series being rectangular in shape, each pulse period including a dwell period of variable length, respective pulses of said first series occurring in time coincidence with respective oppositely poled pulses of said second series, the negative pulses of said first series being effective to cyclically magnetize said core to saturation in one direction, the negative pulses of said second series being effective to cyclically magnetize said core to saturation in the opposite direction, said unidirectional current means adapted to render the application of positive pulses of either series without effect upon the magnetization of said core, means for applying an input signal to said first coil, said input signal comprising the presence or absence, respectively of negative pulses applied in synchronism with the negative pulses of said first series, said negative input signal adapted to render said first unidirectional current means non-conductive to prevent the application of a magnetizing force to said core by said first coil, an output terminal connected to said second coil for deriving a direct output signal therefrom, a non-linear impedance connected between said output terminal and ground, said direct output signal comprising the presence or absence, respectively of pulses which correspond to power amplified input pulses, said output pulses having a frequency which is variable within the length of said dwell period while maintaining the instantaneous pulse power applied to said coils constant.

5. The apparatus of claim 4 and further comprising a third coil wound in the same direction as said second coil upon said core, third unidirectional current means connected in series with said third coil, said last recited means being poled oppositely from said first and second unidirectional current means, an output terminal connected to said third coil for deriving an inverted output signal therefrom, a non-linear impedance connected between said last recited output terminal and ground, said inverted output signal comprising the absence or presence, respectively of power-amplified pulses corresponding to the pulses of said input signal.

6. The apparatus of claim 5 and further including a resistor connected to the free terminal of each of said first and second unidirectional means, said resistors being connected to a common positive D.C. source, the free terminal of said third unidirectional means being connected to ground, said non-linear impedances comprising diodes poled to prevent said output terminals from rising above ground.

7. Binary data storage apparatus comprising a sequence of equal numbers of odd and even saturable, bistable, magnetic cores linked alternately to successively transfer data therebetween, means for simultaneously applying oppositely poled pulses of a first and a second series of alternately positive and negative pulses to said odd cores, means for simultaneously applying oppositely poled pulses of a third and a fourth series of alternately positive and negative pulses to said even cores, the pulses of each of said series being rectangular in shape, each pulse period including a dwell period of variable length, the dwell periods of said first and second pulse series occurring in synchronism, the dwell periods of said third and fourth pulse series occurring in synchronism, pulses of one polarity of said first and third series adapted to cyclically magnetize respective cores to saturation in one direction, pulses of said one polarity of said second and fourth series adapted to cyclically magnetize respective cores to saturation in the opposite direction, the direction of magnetization of each core at any instant being representative of the binary digit stored therein, magnetizing pulses of said second and third series occurring simultaneously to transfer the binary digits stored in said odd cores to sequentially linked even cores, magnetizing pulses of said fourth and first series occurring simultaneously to transfer the binary digits stored in said even cores to sequentially linked odd cores, means for applying an input signal to the first core of said sequence, said input signal comprising the presence or absence of pulses applied simultaneously with the magnetizing pulses of said first pulse series to selectively prevent the magnetization of said first core by the latter pulses, means for deriving an output signal from said fourth pulse series through the agency of the last core in said sequence, said output signal comprising pulses representative of power amplified pulses of said input signal, the pulses of said output signal having a frequency which is variable within the limits of said dwell period while maintaining the instantaneous power input to said cores constant.

8. The apparatus of claim 7 wherein each magnetizing pulse of said first and third pulse series occurs completely within the duration of a magnetizing pulse of respective fourth and second pulse series.

9. The apparatus of claim 7 wherein each magnetizing pulse and the adjacent dwell period of said first and third pulse series occurs completely within the duration of a magnetizing pulse of respective fourth and second pulse series.

10. The apparatus of claim 9 wherein the trailing edge of each magnetizing pulse of said third series precedes the trailing edge of the simultaneously occurring magnetizing pulse of said second series by a time interval of predetermined length, the initial portion of magnetizing pulses of said fourth series overlapping in time the end portion of magnetizing pulses of said second series to an extent no greater than the duration of said time interval; whereby the pulse frequency of the output signal may be increased to the extent of said overlap without increasing the instantaneous power required.

11. The apparatus of claim 10 and further comprising first and second coils wound in opposition on each of said odd cores and respectively adapted to have said first and second pulse series applied thereto, third and fourth coils wound in opposition on each of said even cores and respectively adapted to have said third and fourth pulse series applied thereto, each of said second and third coils being interconnected, unidirectional current means connected in series to each of said coils, said unidirectional current means being rendered non-conductive for the duration of pulses having a polarity opposite to that of said magnetizing pulses to prevent the magnetization of said cores thereby, said input signal pulses additionally rendering the first unidirectional means non-conductive to neutralize the effect of magnetizing pulses of said first series applied to said first coil, a fifth coil wound in the same direction as said fourth coil on the last core of said sequence, unidirectional current means connected in series with said fifth coil and poled to conduct upon the application of a pulse of said opposite polarity, a first output terminal connected to said fourth coil for deriving a direct output signal comprising the presence or absence, respectively of output pulses, a second output terminal connected to said fifth coil for deriving an inverted output signal comprising the absence or presence, respectively of output pulses.

12. The apparatus of claim 11 and further comprising a common source of positive D.C. voltage, a first resistor having a first terminal connected to each of said first coils and a second terminal connected to said source, a second resistor having a first terminal connected to each of said fourth coils and a second terminal connected to said source, a third resistor having a first terminal connected to each of the points of interconnection of said second and third coils and a second terminal connected to said source, the other terminal of said unidirectional means connected to said fifth coil being connected to ground, a clamping diode connected between each of said points of interconnection and ground and between each output terminal and ground, said clamping diodes being poled to conduct when the potential of the point to which they are connected rises above ground.

13. Binary data storage apparatus comprising a sequence of equal numbers of odd and even saturable, bistable, magnetic cores linked alternately to successively transfer data therebetween, means for simultaneously applying oppositely poled pulses of a first and a second series of alternately positive and negative pulses to said odd cores, means for simultaneously applying oppositely poled pulses of a third and a fourth series of alternately positive and negative pulses to said even cores, the pulses of each of said series being rectangular in shape, pulses of one polarity of said first and third series adapted to cyclically magnetize respective cores to saturation in one direction, pulses of said one polarity of said second and fourth series adapted to cyclically magnetize respective cores to saturation in the opposite direction, the direction of magnetization of each core at any instant being representative of the binary digit stored therein, magnetizing pulses of said second and third series occurring simultaneously to transfer the binary digits stored in said odd cores to sequentially linked even cores, magnetizing pulses of said fourth and first series occurring simultaneously to transfer the binary digits stored in said even cores to sequentially linked odd cores, the leading edge of magnetizing pulses of said fourth series preceding the trailing edge of magnetizing pulses of said second series by a time interval of variable length, means for applying an input signal to the first core of said sequence, said input signal comprising the presence or absence of pulses applied simultaneously with the magnetizing pulses of said first pulse series to selectively prevent the magnetization of said first core by the latter pulses, means for deriving an output signal from said fourth pulse series through the agency of the last core in said sequence, said output signal comprising pulses representative of power amplified pulses of said input signal, the pulses of said output signal having a frequency which is variable in accordance with the chosen length of said time interval while maintaining the instantaneous power input to said cores constant.

14. Binary data storage apparatus comprising a sequence of equal numbers of odd and even saturable, bistable, magnetic cores linked alternately to successively transfer data therebetween, means for simultaneously applying oppositely poled pulses of a first and a second series of alternately positive and negative pulses to said odd cores, means for simultaneously applying oppositely poled pulses of a third and a fourth series of alternately positive and negative pulses to said even cores, the pulses of each of said series being rectangular in shape, pulses of one polarity of said first and third series adapted to cyclically magnetize respective cores to saturation in one direction, pulses of said one polarity of said second and fourth series adapted to cyclically magnetize respective cores to saturation in the opposite direction, the direction of magnetization of each core at any instant being representative of the binary digit stored therein, magnetizing pulses of said second and third series occurring simultaneously to transfer the binary digits stored in said odd cores to sequentially linked even cores, magnetizing pulses of said fourth and first series occurring simultaneously to transfer the binary digits stored in said even cores to sequentially linked odd cores, the trailing edge of each magnetizing pulse of said third series preceding the trailing edge of the simultaneously occurring magnetizing pulse of said second series by a time interval of predetermined length, the initial portion of magnetizing pulses of said fourth series overlapping in time the end portion of magnetizing pulses of said second series to an extent no greater than the duration of said time interval, means for applying an input signal to the first core of said sequence, said input signal comprising the presence or absence of pulses applied simultaneously with the magnetizing pulses of said first pulse series to selectively prevent the magnetization of said first core by the latter pulses, means for deriving an output signal from said fourth pulse series through the agency of the last core in said sequence, said output signal comprising pulses representative of power amplified pulses of said input signal, the pulses of said output signal having a frequency which is variable within the limits of maximum overlap as determined by the length of said time interval while maintaining the instantaneous power input to said cores constant.

15. Binary data storage apparatus comprising a sequence of equal numbers of odd and even saturable, bistable, magnetic cores linked alternately to successively transfer data therebetween, means for simultaneously applying oppositely poled pulses of a first and a second series of alternately positive and negative pulses to said odd cores, means for simultaneously applying oppositely poled pulses of a third and a fourth series of alternately positive and negative pulses to said even cores, the pulses of each of said series being rectangular in shape, pulses of one polarity of said first and third series adapted to cyclically magnetize respective cores to saturation in one direction, pulses of said one polarity of said second and fourth series adapted to cyclically magnetize respective cores to saturation in the opposite direction, the direction of magnetization of each core at any instant being representative of the binary digit stored therein, magnetizing pulses of said second and third series occurring simultaneously to transfer the binary digits stored in said odd cores to sequentially linked even cores, magnetizing pulses of said fourth and first series occurring simultaneously to transfer the binary digits stored in said even cores to sequentially linked odd cores, the trailing edge of each magnetizing pulse of said first series preceding the trailing edge of the simultaneously occurring magnetizing pulse of said fourth series by a time interval of predetermined length, the trailing edge of each magnetizing pulse of said third series preceding the trailing edge of the simultaneously occurring magnetizing pulse of said second series by said time interval of predetermined length, the initial portion of magnetizing pulses of said fourth series overlapping in time the end portion of magnetizing pulses of said second series to an extent no greater than the duration of said time interval, the initial portion of magnetizing pulses of said second series overlapping the end portion of magnetizing pulses of said fourth series by an amount equal to said time interval, means for applying an input signal to the first core of said sequence, said input signal comprising the presence or absence of pulses applied simultaneously with the magnetizing pulses of said first pulse series to selectively prevent the magnetization of said first core by the latter pulses, means for deriving an output signal from said fourth pulse series through the agency of the last core in said sequence, said output signal comprising pulses representative of power amplified pulses of said input signal, the pulses of said output signal having a frequency which is variable within the limits of maximum overlap as determined by the length of said time interval while maintaining the instantaneous power input to said cores constant.

16. A power amplifier comprising a saturable, bistable, magnetic core, a first coil wound on said core, second and third coils wound in opposition to said first coil on said core, means for applying a first series of alternately positive and negative pulses to said first coil to cyclically magnetize said core to saturation in one direction, means for applying a second series of alternately positive and negative pulses to said second coil to cyclically magnetize said core to saturation in the opposite direction, means for applying an input signal to said first coil, said input signal comprising the presence or absence, respectively of negative voltage pulses, means for deriving a direct output signal from said second coil, said output signal comprising the presence or absence, respectively of negative voltage pulses, and means for deriving a logically inverted output signal from said third coil, said inverted output signal comprising the absence or presence, respectively of negative voltage pulses.

17. The apparatus of claim 16 and further including a diode connected in series with each of said coils, each diode connected to said first and second coils being further connected to a resistor and poled to be rendered non-conductive upon the application of positive pulses to said coils, the diode connected to said first coil being further rendered non-conductive upon the application of a negative pulse in synchronism with a negative input pulse, the diode connected to said third coil being further connected to ground and being poled to conduct upon the application of a positive pulse, said resistors being connected to a common positive D.C. source, a clamping diode connected across each of the signal outputs, said clamping diode being poled to prevent the output pulses from rising above ground.

References Cited in the file of this patent

UNITED STATES PATENTS

| | | |
|---|---|---|
| 2,729,754 | Steagall | Jan. 3, 1956 |
| 2,782,399 | Rajchman | Feb. 19, 1957 |
| 2,783,455 | Hindall | Feb. 26, 1957 |
| 2,846,667 | Goodell | Aug. 5, 1958 |
| 2,856,596 | Miller | Oct. 14, 1958 |